United States Patent [19]

d'Autry

[11] 4,159,784

[45] Jul. 3, 1979

[54] DEVICE FOR DISPENSING ADJUSTABLE VOLUMES OF A LIQUID

[76] Inventor: Eric M. d'Autry, 69-72, rue Gambetta, 95400 Villiers-le-Bel, France

[21] Appl. No.: 816,448

[22] Filed: Jul. 18, 1977

[30] Foreign Application Priority Data

Aug. 18, 1976 [FR] France ............... 76 25082

[51] Int. Cl.² ............................................. B67D 5/26
[52] U.S. Cl. .............................. 222/32; 73/425.4 P; 222/43; 222/47; 222/309
[58] Field of Search ................ 222/14, 16, 21, 32, 222/43, 47, 309, 380, 381, 382, 383, 384, 385; 73/424.5 P; 92/13.4, 13.5, 13.8

[56] References Cited

U.S. PATENT DOCUMENTS

| | | | |
|---|---|---|---|
| 2,819,934 | 1/1958 | Luterick | 92/13.4 |
| 3,003,470 | 10/1961 | Geyer | 92/13.5 X |
| 3,013,435 | 12/1961 | Rodrigues | 222/309 X |
| 3,143,252 | 8/1964 | Shapiro | 222/309 |
| 3,613,952 | 10/1971 | Gilmont | 222/309 X |
| 3,805,998 | 4/1974 | Croslin | 222/32 |
| 3,827,305 | 8/1974 | Gilson et al. | 222/43 X |
| 3,940,027 | 2/1976 | Marterer | 222/309 |
| 4,003,499 | 1/1977 | Shapiro et al. | 222/309 X |
| 4,072,247 | 2/1978 | Yamazaki | 222/309 X |

Primary Examiner—Robert J. Spar
Assistant Examiner—Fred A. Silverberg
Attorney, Agent, or Firm—Mason, Kolehmainen, Rathburn & Wyss

[57] ABSTRACT

The present invention relates to a device for dispensing adjustable volumes of a liquid, comprising a stopper adaptable on the neck of a flask, which incorporates a device with valves; a calibrated cylinder which is mounted in the stopper and which comprises, near its free upper end, a fixed, outwardly projecting, annular stop; a calibrated cylindrical plunger adapted to cooperate with said calibrated cylinder; a body for actuating the calibrated plunger, internally defining a first cavity in which a threaded adjusting shaft is adapted to be housed, which shaft may modify the vertical position of a nut; a digital display system mounted in the upper part of the threaded shaft; a member for driving the shaft in rotation, and a connector is provided to connect the actuator body with the upper part of the calibrated plunger. The invention finds particular application in laboratory equipment.

12 Claims, 9 Drawing Figures

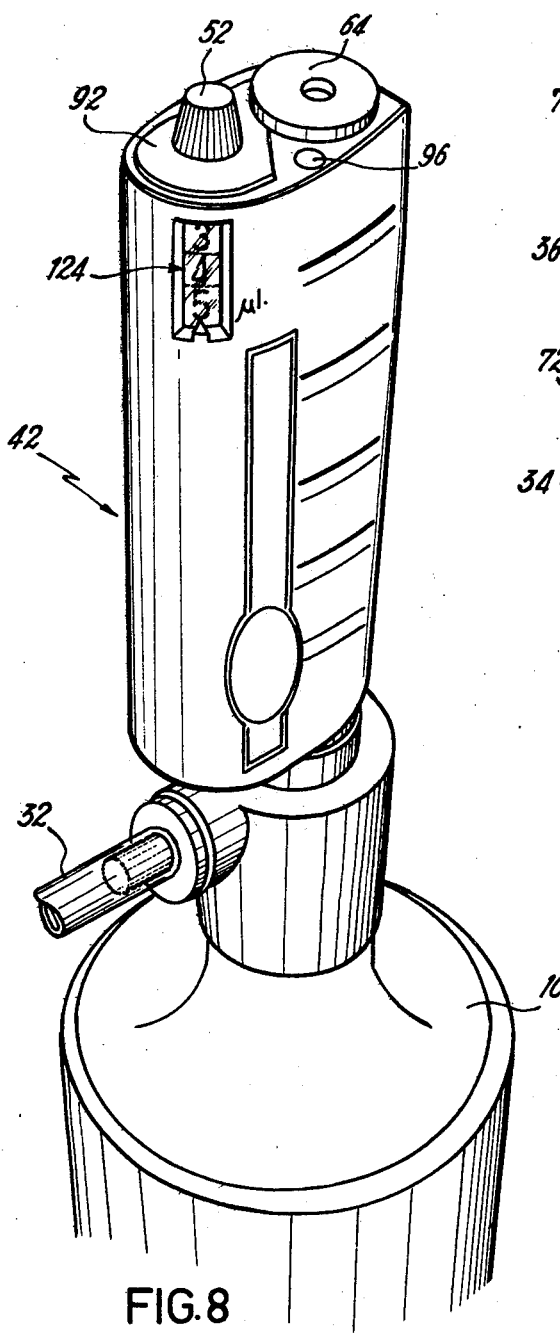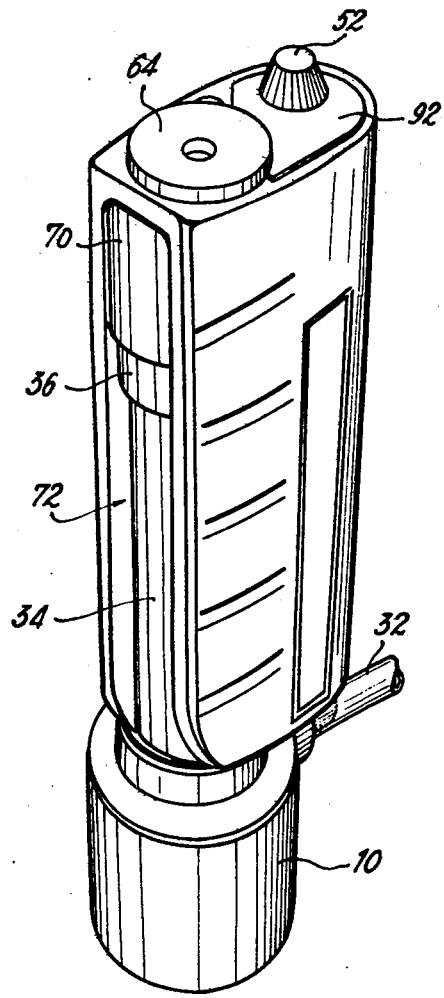
FIG. 8
FIG. 9

DEVICE FOR DISPENSING ADJUSTABLE VOLUMES OF A LIQUID

The present invention relates to a device for dispensing adjustable volumes of a liquid.

Adjustable liquid dispensing devices are already known which comprise a plunger fitted with an outer control body in which is made a longitudinal groove for guiding a stop member limiting the upward stroke of the plunger. This stop is adapted to be immobilised in any chosen position by means of a screw system cooperating with said guide groove. A device of this type does not enable the same volume of liquid to be accurately obtained several times if the position of the stop has meanwhile been changed. On the other hand, the displayed volume and the volume actually taken never exactly correspond, and, in addition, these prior known devices do not allow any adjustment of the zero.

It is an object of the present invention to provide a device for dispensing adjustable volumes of liquid, fitted with a reliable and accurate digital display system, perfectly representative of the volume actually taken. The device according to the invention comprises, in combination:

a stopper adaptable on the neck of a flask containing a liquid, which incorporates a device with valves arranged to allow the taking and dispensing of the liquid and which comprises a suction tube immersed in the liquid, as well as a dispensing tube;

a calibrated cylinder which is hermetically mounted in said stopper, which communicates with said suction tube and which comprises, near its free end, an outwardly projecting fixed annular stop;

a calibrated cylindrical plunger adapted to cooperate with said calibrated cylinder;

a body for actuating said calibrated plunger, internally defining a first cavity in which a threaded adjusting shaft is adapted to be housed, which shaft is immobile in translation and which, when rotated, may modify the vertical position of a nut immobilised in rotation which, by cooperation with said annular stop, acts as stop limiting the upward stroke of said calibrated plunger, said threaded shaft further being fitted in its upper part with a digital display system controlled by the rotation of said shaft, with a view to furnishing an indication translating the vertical position of said nut;

a member for driving said shaft in rotation, and means provided to connect said actuator member with the upper part of said calibrated plunger.

According to a further feature of the present invention, the lateral wall defining said body presents, in the vicinity of said calibrated cylinder, an opening extending from the lower end of said body substantially up to the upper end of said calibrated cylinder with a view to allowing the disengagement of said body, this enabling its disconnection from the rest of the device according to the invention, once the plunger has been withdrawn. Such an arrangement proves particularly advantageous in practice, as this type of apparatus sometimes requires to be sterilised. The fact that the assembly constituted by the actuator body and by the digital display system is removable, enables it to be disconnected from the rest of the device which, itself, is to be subjected to sterilisation; in fact, the plunger and the cylinder are the only elements in contact with the liquids taken. In this way, the most sensitive part of the device according to the invention, namely the digital display system, does not risk deteriorating during the various sterilisation operations.

The invention will be more readily understood on reading the following description with reference to the accompanying drawings, in which:

FIGS. 8 and 9 are views in perspective of the device according to the invention.

In the accompanying Figures, like elements will be designated by like references.

Figure 1:
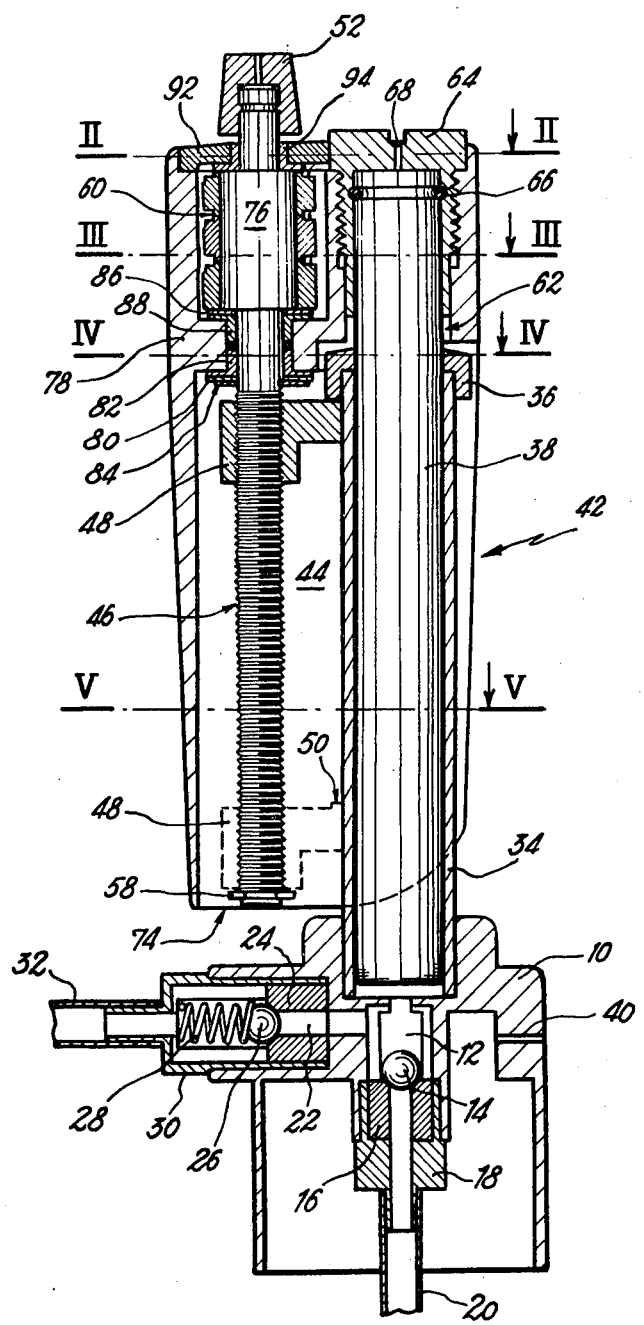
FIG. 1 shows the device according to the invention in section.

Referring now to the drawings, FIG. 1 shows the device for dispensing adjustable volumes of a liquid according to the invention, comprising a stopper 10 adaptable on the neck of a flask or like recipient, (not shown) containing any liquid. The stopper 10, for example made of moulded polypropylene, incorporates a device with valves arranged to allow the taking and dispensing of the liquid. In the stopper 10 is arranged a vertical conduit 12 opening in the upper part of stopper 10, said vertical conduit 12 containing a ball 14, for example made of alumina, mounted on a valve seat 16, for example made of sapphire, itself positioned in said vertical conduit 12 by means of a valve terminal 18 also advantageously made of polypropylene. This first valve is controlled by gravity. At the lower end of the valve terminal 18 is mounted a suction tube 20, for example made of Teflon (registered trade mark), which is immersed in the liquid contained in the flask. The body of the stopper 10 further comprises a horizontal conduit 22 communicating with said vertical conduit 12, and in which is mounted a valve seat 24, for example made of sapphire, on which is adapted a second ball 26 controlled by a spring 28. The whole of this second valve controlled by the spring 28 is positioned by means of a valve terminal 30, for example made of polypropylene, at the free end of which is mounted a liquid dispensing tube 32. All the elements constituting this valve system are made of materials resisting the different liquids taken; the spring 28 controlling the ball 26 of the second valve may thus be made of Teflon-coated stainless steel or iridio-platinum.

The stopper 10 of the dispensing device according to the invention comprises in its upper part a calibrated cylinder 34 mounted hermetically therein, so as to communicate with the suction tube 20. The cylinder 34, made for example of calibrated glass, comprises, near its free upper end an outwardly projecting fixed annular stop 36. In order to produce a liquid taking and dispensing system, the calibrated cylinder 34 receives a calibrated plunger 38 adapted to cooperate therewith. It will readily be understood that, during the upward stroke of this calibrated piston 38, the liquid contained in the flask will rise in the suction tube 20 and the first ball valve will enable said liquid to rise in the calibrated plunger 38. During the descending movement of the plunger 38, the first valve will be closed by gravity, whilst the second valve opens and allows the liquid to pass through the dispenser tube 32. It will be noted that the stopper 10 further comprises an air intake 40 to allow liquid to be taken from the flask.

The device according to the invention comprises a body 42 for actuating the said calibrated plunger 38. This actuator body 42 internally defines a first cavity 44 inside which is housed a threaded adjusting shaft 46. This threaded shaft 46 must remain perfectly immobile in translation inside this first cavity 44. When said rod 46 is rotated, it may alter the vertical position of a nut 48 immobilised in rotation. This nut 48 advantageously comprises a projection 50 adapted to cooperate with the fixed annular stop 36 mounted on the cylindrical calibrated plunger 38 and thus acts as stop limiting the upward stroke of said calibrated plunger 38. The free upper end of said threaded shaft 46 passing beyond the actuator body is fitted with a knurled adjustment button 52 enabling said shaft 46 to be rotated. In order to be locked in rotation, the nut 48 comprises for example two notches 54 adapted to cooperate with longitudinal grooves 56 projecting internally on the walls of body 42 which define the first cavity 44. It will readily be understood that, by rotating the threaded shaft 46, the amplitude of the stroke of the calibrated plunger 38 may be modified by displacing the nut 48 in all the intermediate positions between the two end positions illustrated in FIG. 1.

In order to avoid the nut 48 escaping at the bottom, the lower part of said threaded rod 46 comprises a spring ring 58 or like member, limiting the downward displacement of said nut 48.

The threaded shaft 46 is further fitted in its upper part with a digital display system 60, controlled by the rotation of said shaft, with a view to furnishing an indication translating the vertical position of said nut 48 and the exact value of the volume of liquid to be dispensed. The device according to the invention finally comprises means which are provided to connect the upper part of said plunger 38 to the actuator body 42. In the embodiment described, said means provided for connecting the plunger 38 with the body 42 for actuating said plunger are in the form of a second cavity 62 made in the body 42 and a cap 64 adapted to be removably fixed in said second cavity 62. The cap 64 is made fast with the calibrated plunger 38 by any means; for example it is fixed thereto by means of a line of adhesive 66. To avoid the formation of an air cushion in the upper part of this cap 64, a hole 68 has been made, enabling the air to escape on assembly. In the particular embodiment described, the cap 64 fast with said plunger 38 is threaded on its outer side surface to enable it to be screwed in the second cavity 62.

Figure 2:
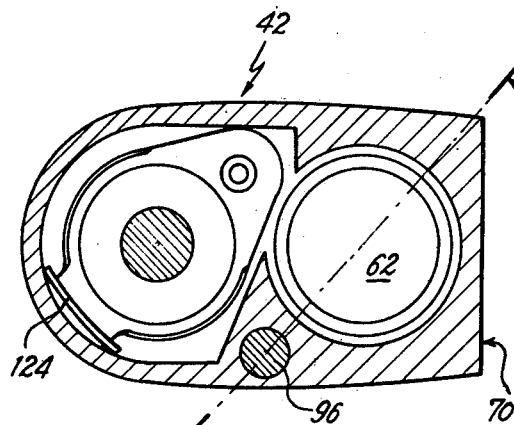
FIG. 2 is a section along line II—II of FIG. 1.
Figure 3:
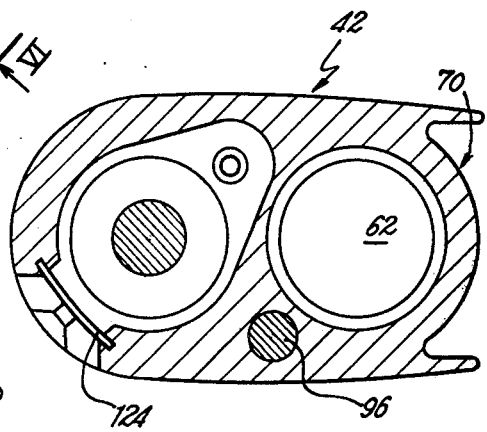
FIG. 3 is a section along line III—III of FIG. 1.
Figure 4:
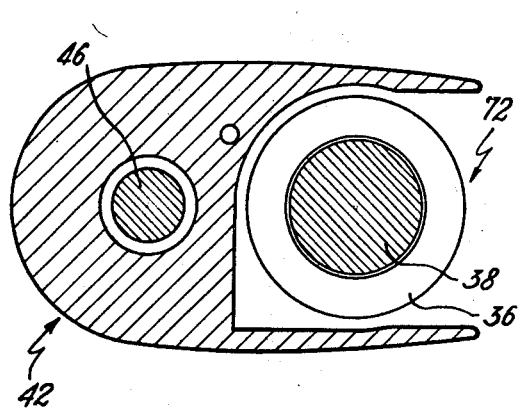
FIG. 4 is a section along line IV—IV of FIG. 1.
Figure 5:
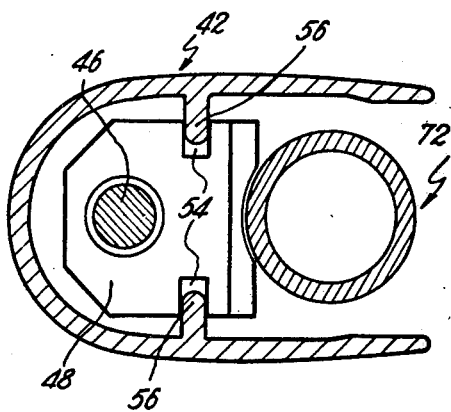
FIG. 5 is a section along line V—V of FIG. 1.

Since the calibrated plunger 38 and the calibrated cylinder 34 come into contact with the liquid to be taken and dispensed, these elements should from time to time be sterilised. As this sterilisation operation risks deteriorating the rest of the device, and particularly the digital display system 60, it is important to be able to separate the actuator body 42 from the rest of the device. In the particular embodiment shown, the side wall 70 defining the said body 42 presents an opening 72. This opening 72 extends from the lower end 74 of said body substantially as far as the upper end of the calibrated cylinder 34. An opening of this type makes it possible, once the plunger 38 and its cap 64 have been removed, to disconnect the actuator body 42, incorporating the digital display system 60, from the rest of the device. The presence of this opening 72 clearly appears in the sections of FIGS. 2, 3, 4 and in the two perspective views of FIGS. 8 and 9. When it is desired to sterilise the device, the cap 64 is firstly unscrewed, this enabling the cap-calibrated cylinder assembly to be removed from the second cavity 62, and it remains only to disengage the actuator body 42 laterally from the rest of the device.

In the embodiment described, the threaded shaft 46 comprises, in the vicinity of its upper part, an enlarged portion 76 on which is mounted the digital display system 60. Furthermore, the first cavity 44 comprises a narrow zone 78 whose upper shoulder cooperates with the lower shoulder of the enlarged part 76 of the threaded shaft 46. Between these two shoulders are interposed a washer 80, for example made of Teflon, as well as a bearing 82 also advantageous made of Teflon. In order to immobilise said shaft 46 in translation, this being indispensable for obtaining a precise adjustment of the volume to be taken and dispensed, said shaft comprises a spring ring 84 cooperating with the lower shoulder of the narrow zone 78 of the first cavity 44. Between this lower shoulder and the ring 84 are also interposed a second washer 86 and a second bearing 88. Between the two bearings 82 and 88 is mounted an O-ring 90 compressed between the inner surface of the narrow part 78 and the corresponding adjacent outer surface of said threaded shaft 46. This O-ring 90 acts as a braking ring which is intended to immobilise the shaft 46 in the chosen position. The O-ring 90 will therefore preferably be made of a material resistant to wear and tear, for example polyurethane. In its upper part, the first cavity 44 is closed by a lid 92 which also abuts on the upper shoulder of the enlarged part 78 of said threaded shaft 46. Between the lower part of the lid 92 and the upper shoulder of the enlarged part 76 there is also interposed a bearing 94 for example made of Teflon. Such an arrangement allows the threaded shaft 46 to be perfectly positioned and therefore prevents any transverse movement thereof.

Figure 6:
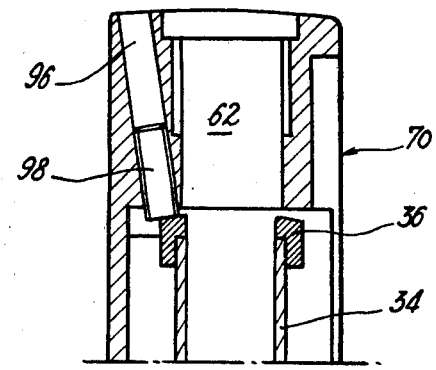
FIG. 6 is a partial view of a section along line VI—VI of FIG. 2.

In order to allow the adjustment of the zero of the device according to the invention, the actuator body 42 comprises, in its upper part, a threaded hole 96 adapted to receive an adjusting screw 98. As may be seen in FIG. 6, the lower end of this adjusting screw 98 cooperates with the upper surface of the fixed annular stop 36 of the calibrated cylinder 34. Since, for reasons of bulk, said threaded hole 96 has been arranged so as to inclined slightly, the upper surface of the fixed annular stop 36 of the calibrated cylinder 34 also comprises a slightly inclined plane. As the zero is to be adjusted fairly rarely and with a view to avoiding any misadjustment of this zero further to a false manoeuvre, the head of the adjusting screw 98 is completely embedded in the threaded hole 96.

Figure 7:
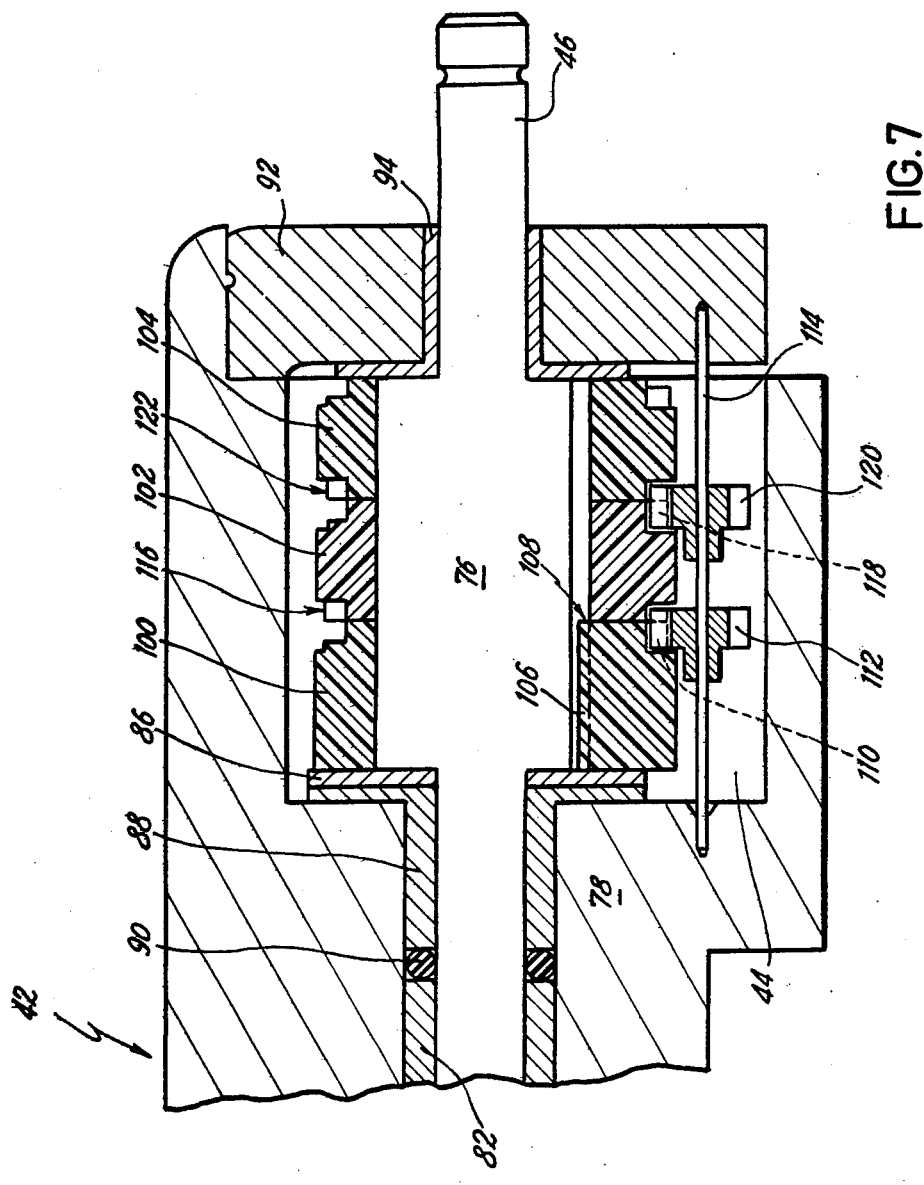
FIG. 7 is a view in section, on a larger scale, of the digital display system of the device according to the invention.

The digital display system 60, shown in greater detail in FIG. 7, comprises a plurality of indicator rings 100, 102 and 104 surrounding said threaded shaft 46, one of these rings (100) being made fast with said shaft 46 so as to rotate therewith. This display system 60 further comprises drive means coupled to said rings to control their relative movement as a function of the rotation of said threaded shaft 46. This digital system 60 gives an exact, easily legible indication of the position of the nut 48. A series of indicator rings 100, 102 and 104, each fitted on the shaft 46, are stacked inside the first cavity 44, between the washer 86 and the adjacent bearing 94 of the lid 92. In the particular embodiment shown, the rings indicate the adjustments of the volumes in units, tens and hundreds of microliters. However, it is obvious that more or fewer rings may be provided which may be graduated in any other desired unit. The units ring 100 comprises a protuberance 106 which projects inwardly and which is inserted for example in a groove 108 in order to rotate units ring 100 with the threaded shaft 46. The tens ring 102 and hundreds ring 104 are furthermore perfectly free to rotate independently of any rotary movement of the threaded shaft 46. The relative movement of the rings is effected in conventional manner. For a complete rotation of the units ring 100, a single pair of teeth 110 drives a spur gear 112 mounted on a shaft 114 which passes through the upper part of the cavity 44 of the body 42. The gear 112 drives continuous gears 116 on the tens ring 102 to move it by a tenth of a revolution. Similarly, a full revolution of the tens ring 102 results in incremental movement of the hundreds ring 104 by a single pair of gear teeth 118, an additional spur gear 120 and a continuous gear 122 on the hundreds ring 104.

The actuator body 42 further presents, on its side wall, a window 124 showing the indicator rings 100 to 104.

It is obvious that the thread of the threaded shaft 46, as well as the diameter of the calibrated plunger 38 must be chosen very precisely so that a full revolution of said threaded shaft 46 corresponds exactly to a sub-multiple of the unit of volume displayed. In practice, a threaded shaft is used, for example, with a diameter of 6 mm and a thread of 1 mm. To botain a device allowing the dispensing of volumes varying from 0 to 500 $\mu^1$, a plunger is used, for example, having a diameter of 3.568 mm. If it is desired to obtain a maximum volume of 5 ml, a plunger of 11.284 mm will be used, and if it is desired to obtain a maximum volume of 50 ml, a plunger will be used with diameter 35.685 mm. In practice, this type of calibrated plunger 38 may be made of Teflon-coated ceramics or Teflon-coated alumina.

Since the nut 48 and the fixed stop 36 must cooperate very precisely, the stop 36 will preferably be made of a very hard material, for example glass-reinforced macrolon. The nut 48 may, for its part, be made of Teflon-coated aluminium or glass-reinforced macrolon.

It is obvious that the present invention is not limited to the particular embodiment which has been described, but may cover variants thereto without departing from the scope thereof. For example, the means for connecting the actuator body 42 to the upper part of the plunger 38 may be made differently. However, it is highly advantageous to employ means which enable the assembly constituted by the actuator body 42 and the digital display device 60, easily to be disconnected from the rest of the device according to the invention.

What is claimed is:

1. In a device for dispensing adjustable volumes of a liquid, the combination of:
    a stopper mounted on the neck of a flask or like recipient containg a liquid, which incorporates a device with valves arranged to allow the taking and dispensing of the liquid and which comprises a suction tube immersed in the liquid, as well as a dispensing tube;
    a calibrated cylinder which is hermetically mounted in said stopper, which communicates with said suction tube and which comprises, near its free upper end an outwardly projecting fixed annular stop;
    a calibrated cylindrical plunger adapted to cooperate with said calibrated cylinder;
    a body for actuating said calibrated plunger, internally defining a first cavity in which a threaded adjusting shaft is adapted to be housed, wherein said shaft is immobile in translation in said first cavity and which, when rotated, may modify the vertical position of a nut immobilised in rotation which, by cooperation with said annular stop, acts as stop limiting the upward stroke of said calibrated plunger;
    a digital display system mounted on the upper part of said threaded shaft so as to be controlled by the rotation of said shaft so as to furnish an indication of the translation of the vertical position of said nut and therefore the value of the volume of liquid to be dispensed;
    a member for driving said shaft in rotation, and
    means for connecting said actuator body with the upper part of said calibrated plunger wherein said means for connecting the plunger with said plunger actuating body are in the form of a second cylindrical cavity in said body, a cap fast with said plunger being adapted to be removably fixed in said second cavity wherein, in the vicinity of said calibrated cylinder, the lateral wall defining said body presents an opening extending from the lower end of said body substantially as far as the upper end of the calibrated cylinder with allowing the disengagement of said body, thus enabling it to be disconnected from the rest of the device once the plunger and its cap have been removed.

2. The device of claim 1, wherein said cap fast with said plunger is threaded on its outer lateral surface and is screwed into said second cavity.

3. The device of claim 1, wherein the said nut is immobilised in rotation by the presence therein of notches adapted to cooperate with internal projections on the walls of the body which define said first cavity in which said threaded shaft is housed.

4. The device of claim 3, wherein the first cavity is closed at its upper part by a lid which ensures a perfect positioning of the threaded shaft, prohibiting any transverse movement of said shaft.

5. The device of claim 1, wherein said threaded shaft comprises, near its upper part, an enlarged part on which said digital display system is mounted.

6. The device of claim 5, wherein the first cavity comprises a narrow zone of which the upper shoulder cooperates with the lower shoulder of the enlarged part of the threaded shaft.

7. The device of claim 6, wherein the threaded shaft is immobilized in upward translation by a spring ring cooperating with the lower shoulder of the narrow zone of the first cavity.

8. The device of claim 1, wherein the threaded shaft comprises, near its lower end, a spring clip intended to prevent the nut from escaping at the bottom.

9. The device of claim 1, wherein said actuator body comprises in its upper part a threaded hole adapted to receive an adjusting screw, the lower end of which cooperates with the upper surface of the fixed annular stop of the calibrated cylinder.

10. The device of claim 1, wherein the thread of the threaded shaft as well as the diameter of the calibrated plunger are chosen so that a full revolution of said threaded shaft corresponds exactly to a submultiple of the unit of volume displayed.

11. The device of claim 1, wherein the digital display system comprises a plurality of indicator rings surrounding said threaded shaft, one of the rings being rendered fixed to said shaft so as to rotate therewith, and drive means coupled to said rings to control their relative movements as a function of the rotation of said shaft.

12. The device of claim 11, wherein the actuator body presents in its side wall a window showing the indicator rings.

* * * * *